United States Patent [19]

Torland et al.

[11] 4,344,442
[45] Aug. 17, 1982

[54] ANTI-WRAP APPARATUS

[75] Inventors: Peter J. Torland, New Holland; Robert R. Todd, Leola, both of Pa.

[73] Assignee: Sperry Corporation, New Holland, Pa.

[21] Appl. No.: 257,025

[22] Filed: Apr. 24, 1981

[51] Int. Cl.³ .......................... A01F 7/06; A01F 7/00
[52] U.S. Cl. ............................. 130/27 T; 130/27 R
[58] Field of Search ............ 56/14.6; 130/27 T, 27 R, 130/27 M

[56] References Cited

U.S. PATENT DOCUMENTS

| | | | |
|---|---|---|---|
| 1,604,912 | 10/1926 | Hathaway | 130/27 T |
| 1,910,357 | 5/1933 | Nye | 130/27 M |
| 3,227,104 | 1/1966 | Lawrence et al. | 56/1 |
| 4,108,150 | 8/1978 | Shaver | 56/14.6 |
| 4,248,249 | 2/1981 | Dunn et al. | 130/27 T |
| 4,250,896 | 2/1981 | Wagstaff et al. | 130/27 T |
| 4,300,333 | 11/1981 | Anderson | 56/14.5 |

*Primary Examiner*—Paul J. Hirsch
*Attorney, Agent, or Firm*—Larry W. Miller; Frank A. Seemar

[57] ABSTRACT

Augers used in farm machinery are generally rotatably mounted in a bearing plate. Often the small diameter rotor shaft of the auger becomes fouled by crop material which wraps around the shaft ultimately inhibiting rotation and sometimes damaging rotor bearings. This is avoided by rotatably mounting a larger diameter auger tube within a recess formed in the bearing plate.

9 Claims, 5 Drawing Figures

4,344,442

ANTI-WRAP APPARATUS

BACKGROUND OF THE INVENTION

This invention relates generally to threshing machines and more particularly to those having longitudinal cylinders.

Although the disclosures of this invention are particularly desirable for use with farm machinery, particularly of the axial flow combine harvester type, it is recognized that other uses are possible especially where rotating parts are subject to fouling by material wrapping at the juncture of a bearing and a bearing mounted rotor shaft.

In crop harvesting machines, augers are often used for conveying crop grass or other fiberous material. Such augers usually are rotatably mounted by means of a stub shaft extending from the opposite ends of the auger. The shafts are generally of a small diameter and are bearing mounted in a support plate. The crop material often is able to wedge between the plate and the end of the auger, thus wrapping around the rotating shafts which can cause the bearings to overheat and fail, or damages the bearing seal resulting in loss of lubricating fluid.

The foregoing illustrates limitations of the known prior art. Thus, it is apparent that it would be advantageous to provide an alternative directed to overcoming one or more of the limitations as set forth above.

Accordingly, a suitable alternative is to provide an auger-bearing connection which limits crop material access to the region where the small diameter stub shaft extends into the bearing.

SUMMARY OF THE INVENTION

In one aspect of the present invention, this is accomplished by providing an anti-wrap apparatus including a bearing plate assembly having a recess formed therein. The recess has a predetermined diameter. A rotor has an auger tube of substantially the predetermined diameter so that the auger tube extends into the recess where the rotor is rotatably mounted in the bearing plate assembly.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
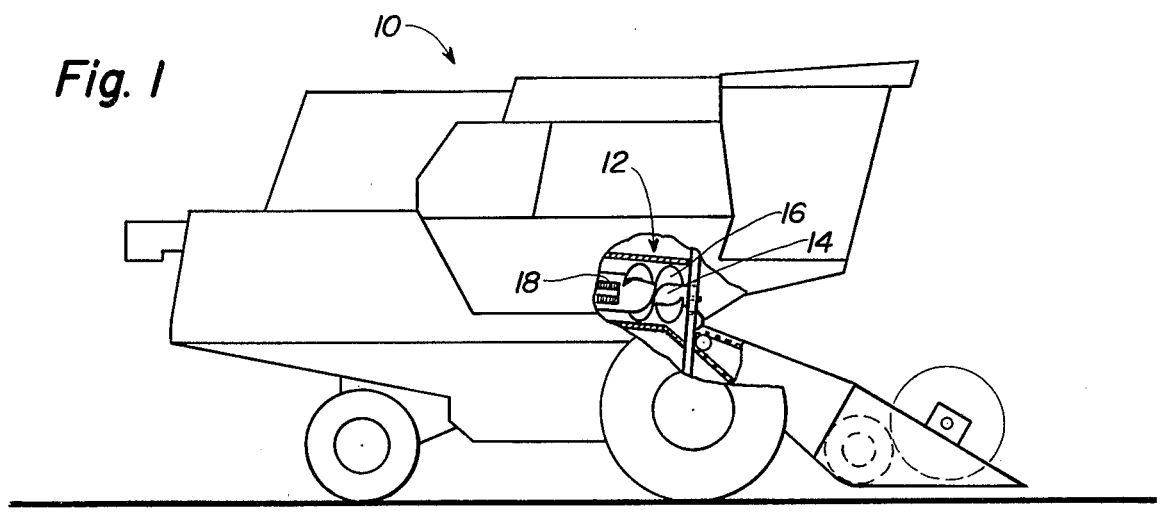
FIG. 1 is a view illustrating an exemplary axial flow type combine harvester.

FIG. 1 illustrates a self-propelled combine harvester, generally designated 10, of the well known axial flow type which may include one or two rotors 12 which are each mounted within concaves for rotating about an axis which generally extends in the direction of travel of the combine.

Figure 2:
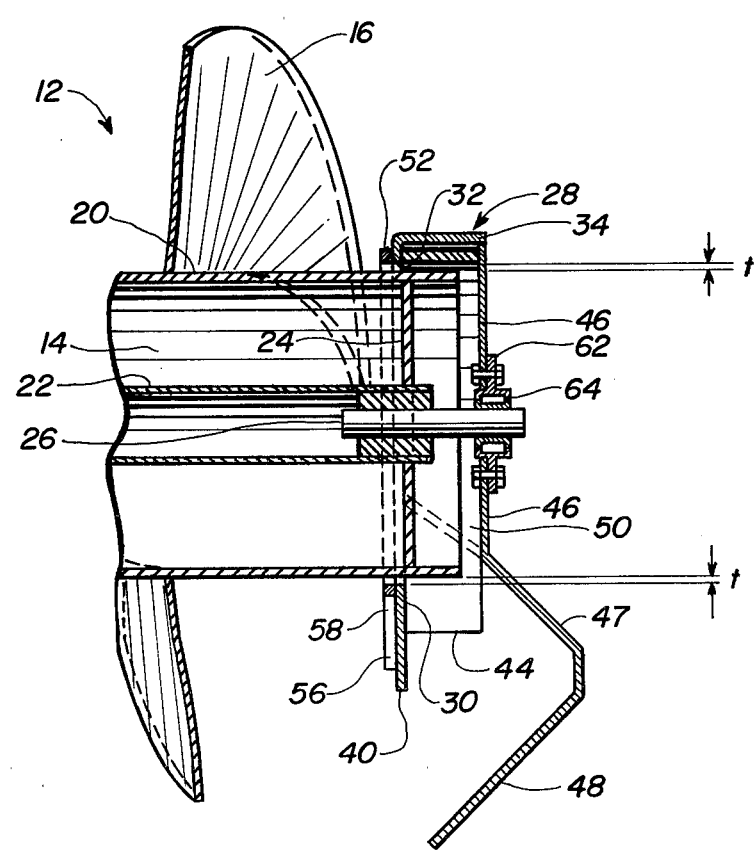
FIG. 2 is a partial cross-sectional view illustrating an embodiment of the present invention.
Figure 3:
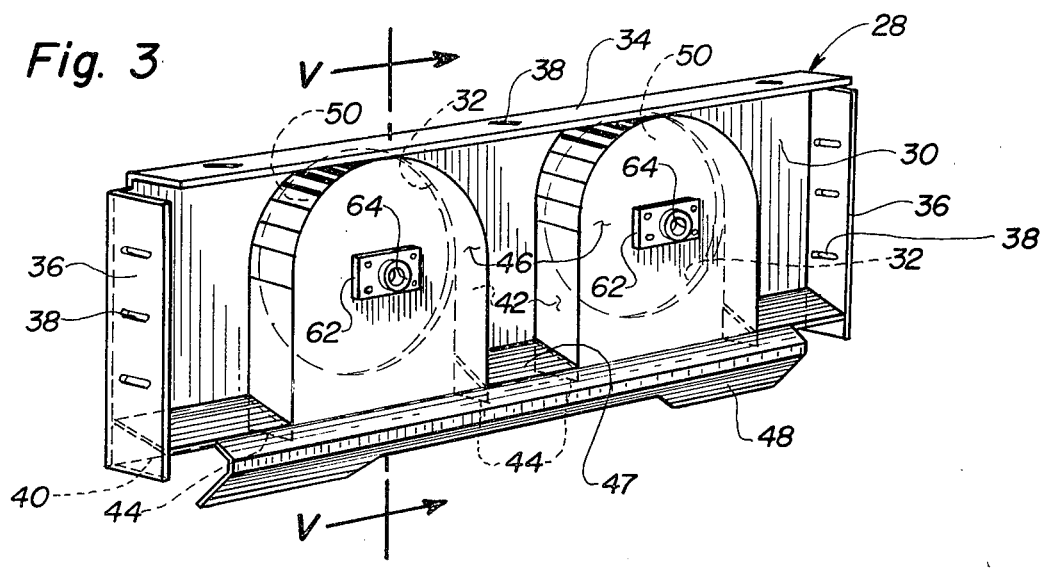
FIG. 3 is an isometric frontal view of an embodiment of the bearing plate assembly of this invention.

Each rotor 12 generally includes a rotor auger tube portion 14 including auger flightings 16 and a rasp bar portion 18. Rotor auger tube portion 14, FIG. 2, comprises an outer cylindrical steel wall 20 and an inner cylindrical steel wall 22 interconnected by a steel tube endwall 24. A steel stub shaft 26 extends from tube endwall 24 and is rotatably mounted in a rotor front bearing plate assembly 28, to be discussed later. Outer cylindrical wall 20 is of a predetermined diameter which may be varied to satisfy design requirements.

Rotor front bearing plate assembly 28 is best illustrated in FIGS. 2-5 and includes a main steel plate portion 30 having a pair of circular apertures 32 formed therein. The apertures are also of a predetermined diameter which is slightly less than the predetermined diameter of tube wall 20. By slightly less, is meant that, tube 40 can rotate within aperture 32 without interference but wall 20 fits within aperture 32 at a tolerance "t" which is small enough to greatly limit crop material from passing between wall 20 and aperture 32 and possibly wrap around shaft 26. This overcomes previous known problems and is beneficial since the crop material is less likely to wrap around the diameter of cylindrical wall 20 which is substantially greater than the comparatively smaller diameter of shaft 26 (see especially FIG. 2). Plate assembly 28 includes a top flange 34 and a pair of side flanges 36 bent at about 90 degrees relative to main plate 30 for reinforcing bearing plate assembly 28 and for attachment to combine 10 via bolts through bolt holes 38. Bearing plate assembly 28 terminates at a contoured bottom skirt 40.

A steel side wall portion 42, which may be U-shaped, is welded to plate 28 adjacent apertures 32 in a manner such that open ends 44 of wall portion 42 extend downwardly adjacent skirt 40. The open ends 44 allows chaff and short stems, which may find their way between the aperture 32 and the tubular wall 20, to fall out rather than accumulate.

A steel end wall portion 46 is welded to main plate 30 and side wall portion 42. End wall portion 46 extends sloping outwardly and downwardly at 47 relative to main plate 30 for reinforcing bearing plate assembly 28 and then is bent back toward main plate 30 for forming a feeder housing seal support 48. Together, main plate 30, side wall portions 42, and end wall portions 46, form a pair of recessed portions 50 in bearing plate assembly 28. Recesses 50 are open ended at ends 44 adjacent skirt 40 and have a diameter at least as great as the diameter of apertures 32. An aperture 31 formed in each end wall portion 46 is concentric with each aperture 32.

Figure 4:
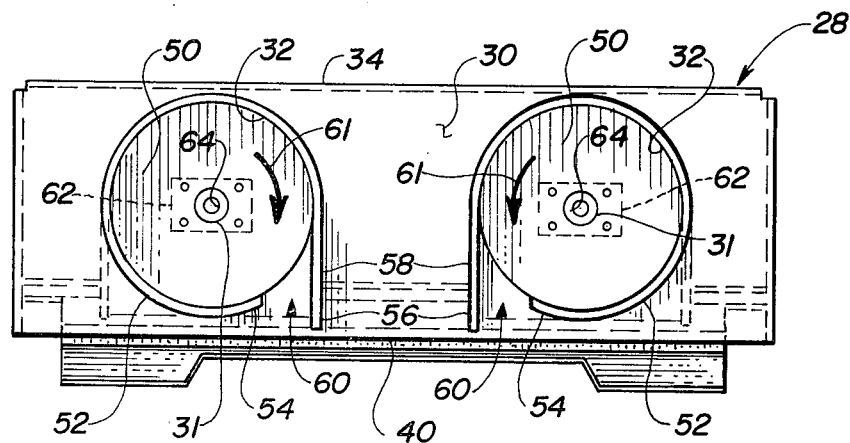
FIG. 4 is a plan view of the back of an embodiment of the bearing plate assembly of this invention.
Figure 5:
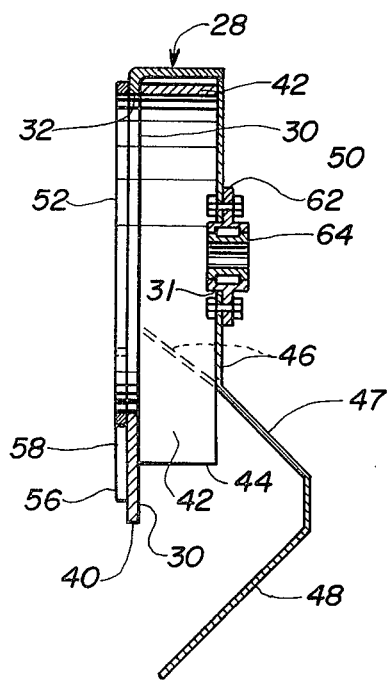
FIG. 5 is a cross-sectional side view illustrating an embodiment of the bearing plate assembly viewed along line V—V of FIG. 3.

A steel stripper member 52, FIG. 4, is welded to plate 28 adjacent apertures 32. Each stripper member 52 forms an arcuate lip in raised relationship with aperture 32. Member or lip 52 is generally in the form of a ring having a first end 54 arcuately extending to a second end 56 which forms an extended leg 58 adjacent an opening 60. Each leg 58 extends downwardly toward skirt 40 generally tangentially to aperture 32 and in the direction of the counter-rotating rotors 12, as indicated by the directional arrows 61 in FIG. 4. As a result, any crop material which may accumulate around wall 20 can be stripped therefrom by lip 52 and directed through opening 60 between ends 54 and 56.

A steel shaft support member 62 is mounted in recessed portion 50 of plate assembly 28, preferably by being bolted to end wall portion 46 adjacent aperture 31. A bearing 64, mounted in bearing support member 62, rotatably receives stub shaft 26 so that tubular wall 20 is rotatably mounted within recessed portion 50.

With the parts assembled as set forth above, stub shaft 26 is rotatably mounted in bearing 64 which locates stub shaft 26 within recessed portion 50. Cylindrical wall 20 of rotor auger tube 14 is similarly mounted to terminate within recessed portion 50. Thus, a relatively small clearance "t" between aperture 32 and wall 20 limits crop material access to possibly wrap around stub shaft 26. Furthermore, lip 52 assists in limiting accumulation of crop material around tube 20.

The foregoing has described an auger-bearing connection which limits crop material access to the region where the small diameter stub shaft extends into the bearing.

It is anticipated that aspects of the present invention, other than those specifically defined in the appended claims, can be obtained from the foregoing description and the drawings.

Having thus described the invention, what is claimed is:

1. In a combine having a frame on which is mounted at least one rotor supported in a rotor bearing plate for rotational movement about an axis of rotation, said rotor having a cylindrical axially aligned outer wall terminating at a first end adjacent said rotor bearing plate, crop conveying elements attached to said outer wall for conveying crop material away from said first end, and a shaft forming said axis of rotation and projecting outwardly from said first end for supporting said rotor within said rotor bearing plate, said outer wall of said rotor having a first diameter, an improved rotor bearing plate assembly comprising:

a first planar portion extending generally transverse to said axis of rotation;

means for connecting said first planar portion to said frame;

a recessed portion formed in said first planar portion to correspond to each said rotor, said recessed portion having an arcuate side wall affixed to said first planar portion and positioned in axial alignment with said axis of rotation of said rotor so as to have a second diameter slightly larger than said first diameter of said rotor outer wall, said recessed portion further having an end wall affixed to said arcuate side wall and positioned generally parallel to said first planar portion at a spaced relationship thereto;

a shaft support mounted in said end wall of said recessed portion; and a bearing mounted in said shaft support in said end wall for rotatably supporting said rotor shaft such that said rotor outer wall extends into said recessed portion with said first end of said rotor being positioned between said first planar portion and said end wall.

2. The combine of claim 1 wherein the difference between said first and second diameters is sufficient to permit said outer wall to rotate within said recessed portion without interference, yet small enough to limit crop material from passing between said side wall of said recessed portion and said outer wall of said rotor.

3. The combine of claim 2 wherein an opening is formed in said sidewall below said rotor to permit any material passing between said recessed portion sidewall and said rotor outer wall to fall through said recessed portion rather than accumulate between said rotor and said recessed portion.

4. The combine of claim 2 or 3 wherein said rotor bearing plate further includes a stripper member mounted on said first planar portion adjacent said recessed portion to strip away any crop material accumulating on said rotor outer wall adjacent said side wall of said recessed portion.

5. The combine of claim 4 wherein said stripper member is formed by an arcuate lip at least partially encircling said recessed portion adjacent said rotor.

6. The combine of claim 5 wherein said arcuate lip includes a leg extending generally tangentially to the rotation of said rotor, said arcuate lip forming a ring extending from said leg around said recessed portion to terminate at a position spaced from said leg and form an opening in said ring for the passage of material stripped from said rotor.

7. The combine of claim 6 wherein said end wall forms a reinforcing ridge below said shaft support member to give some rigidity to said first planar member by extending outwardly and downwardly relative to said first planar member.

8. The combine of claim 7 wherein said reinforcing ridge extends the entire length of said rotor bearing plate assembly.

9. The combine of claim 8 wherein said reinforcing ridge terminates in a contoured edge and forms a seal for an infeed housing mounted on said frame to deliver crop material to said at least one rotor.

* * * * *